United States Patent [19]

Weintraub

[11] Patent Number: 5,057,159

[45] Date of Patent: * Oct. 15, 1991

[54] CONTINUOUS AUTOMATIC SNOW AND ICE PREVENTION AND CLEARING OF WINDOWS, LIGHTS AND MIRRORS

[76] Inventor: Morton Weintraub, P.O. Box 229, Brooklyn, N.Y. 11230

[*] Notice: The portion of the term of this patent subsequent to Oct. 31, 2006 has been disclaimed.

[21] Appl. No.: 374,308

[22] Filed: Jun. 30, 1989

Related U.S. Application Data

[63] Continuation-in-part of Ser. No. 126,469, Nov. 30, 1987, Pat. No. 4,877,458.

[51] Int. Cl.$^5$ .................................................. B08B 7/04
[52] U.S. Cl. .................................... 134/5; 134/22.16; 134/40; 134/171; 134/172
[58] Field of Search ............... 134/5, 6, 40, 22.16, 134/93; 52/171, 172

[56] References Cited

U.S. PATENT DOCUMENTS

| | | | |
|---|---|---|---|
| 3,537,894 | 11/1970 | Thompson | 134/22.18 |
| 4,512,907 | 4/1985 | McConnell | ·252/70 |
| 4,597,884 | 7/1986 | Greenwald | 252/70 |
| 4,654,157 | 3/1987 | Fukunga | 252/70 |
| 4,711,257 | 12/1987 | Kobayashi | 134/45 |
| 4,877,458 | 10/1989 | Trop | 134/5 |

*Primary Examiner*—Asok Pal

[57] ABSTRACT

The present application relates to the means and method for controlling automatically the quantity of accumulation of snow and ice upon automobile (herein defined as a vehicle carrying an engine by which it is propelled) windows, mirrors and lights, and upon domicile, and office windows, mirrors and lights thus blocking clear vision thereof and requiring clearing; and for automatically preventing an accumulation of ice and snow from forming upon automobile, domicile and office windows, mirrors and lights thus blocking clear vision and illumination, and requiring clearing even while present snow and ice clearing mechanisms were not in operation. Liquid pumping means for the acceleration of the pace of the prevention and clearing of the accumulation of the ice and snow.

34 Claims, 1 Drawing Sheet

CONTINUOUS AUTOMATIC SNOW AND ICE PREVENTION AND CLEARING OF WINDOWS, LIGHTS AND MIRRORS

BACKGROUND OF THE INVENTION

This is a continuation in part of application Ser. No. 126,469, filed 11/30/87, now U.S. Pat. No. 4,877,458.

The problems pertaining to the mechanism and methods for clearing condensation, snow and ice of the prior state of the art are as follows:

1) Snow falling overnight or when an automobile is parked for long periods and ice forming below the snow could not be cleared from automobile windows, external mirrors, external lights and from office and domicile windows, mirrors, and lights without a) great exertion and b) loss of time.

2) Prior art provided no inexpensive automatic method and apparatus for automatically preventing ice from forming and snow from blocking automobile windows and external mirrors and automobile lights exposed to snow and ice while the automobile was parked and while the automobile was operating through traffic.

3) Prior art provided no inexpensive automatic method for preventing formation of condensation, ice and snow blocking the vision via domicile, office and automobile windows and external mirrors and lights when existing mechanism for achieving same fails.

4) Although Fukunaga (U.S. Pat. No. 4,654,157 issued 3/19/87) teach various thawing agents such as $CaCl_2$, $CaSO_4$, $MgCl_2$ for clearing snow/ice from a surface. Greenwald (U.S. Pat. No. 4,597,886 issued 7/19/86) teaches urea and McConnell (U.S. Pat. No. 4,512,907 issued 4/1/85) teaches NaCl, urea as the composition for melting ice/snow. All of the above teach a thawing process when any of the above listed chemicals is applied to the snow and ice. They do not teach as taught herein: 1) the use of snow and ice falling from the sky into a container as a means of snow/ice hygroscopic material mix for clearing and preventing snow and ice from accumulating on domicile, office and automobile windows lights and mirrors. Hence, the use in clearing simultaneously and independently an accumulation of snow and ice and condensation already accumulated and/or preventing the accumulation of same upon windows, lights, mirrors, with the above listed chemicals is new and quite different than the use taught by the cited patents as it particularly pointed out in the claims.

5) The independent claims of this application provide the following limitations not provided in the patents cited above: a) attaching a special kind of container as described in the independent claims containing hygroscopic material to an automobile in proximity to the automobile window b) the special kind of container also provides the means for providing contact with the material by the falling snow and ice c) the special container also provides the means for providing for the snow and ice and hygroscopic material to seep onto the automobile and other windows, mirrors, lights for completing the process of clearing and/or preventing the accumulation of additional snow and ice. The points pointed out above, comprising the steps and limitations of the claims of this application are not provided in any of the patents cited above.

The independent claims in this application also provide, in addition to the above limitations, the following limitations and steps: pumping liquid pumping means for advancing the dissolving of the hygroscopic material in accordance with the rate of pumping thereby providing faster regulated seepage from the specially built container. A plurality of the chemical listed in the dependent claims is not taught in any of the patents cited above (neither is the prevention and clearing of an accumulation of condensation taught therein). Obviously, the further limitations provided in the dependent claims clearly point out that the method claimed herein is for a method of clearing and preventing the accumulation of snow and ice and condensation on a window, mirror, light is not an obvious step over the patents cited above. The limitation of use the container in the claims herein may be compared to a raincoat. Just as a raincoat is a special kind of clothing in that the raincoat is worn also when it is not raining since it is intended to protect its owner against possible rain, likewise the special container containing the hygroscopic material remains on the window, mirror, light, automobile in case of falling snow/ice/condensation although snow-/ice/condensation may not fall.

Accordingly, a first objective of the invention is to provide a means and method for automatically controlling the quantity of snow falling upon windows, external mirrors, and lights thus blocking clear vision thereof and requiring clearing.

Another objective of the invention is to provide a means and method for automatically preventing ice from forming on windows, external mirrors and lights as well as reducing and accumulation of condensation thereon based on the principle: Hygroscopic salts absorb humidity quickly. The dry salts become wet and continue to absorb humidity until they dissolve completely forming a liquid solution. The solution is highly concentrated and acquires cryoscopic nature thereby reducing the melting point of ice by several degrees. Hence, ice or snow coming into contact with the liquid solution melts and turns to a liquid. Hence, a plurality of containers containing a quantity of hygroscopic material may simultaneously and independently absorb condensation forming on the either side of an automobile window(s), mirror(s) or light(s) or on either side of domicile and office window(s), mirror(s) and light(s) and falling snow and ice on the outside of the window(s), mirror(s) and light(s).

Another objective of the invention is to provide an apparatus and method providing an operator of an automobile with continuous clear vision without the effort of clearing falling snow and forming ice from the windows when he enters his automobile after it was parked while present snow and ice clearing mechanisms were not in operation.

Another objective of the invention is to provide an apparatus and method providing an operator of an automobile or a user of a window of a domicile or office with reduced accumulation of condensation upon of his window resulting from condensation or a difference of condensation from the internal (facing the inside of the domicile or automobile) and external (facing the outside of the domicile or automobile) portions of the window while present condensation clearing mechanisms were not in operation, or were not available.

Another objective of the invention is to provide a method wherein a plurality of containers containing hygroscopic material such that each of the plurality operating simultaneously in conjunction with one another and independently of one another for preventing and clearing an accumulation of condensation, and an accumulation of ice and an accumulation of snow simultaneously and independently.

A another objective of the invention is to provide a method comprising wherein clearing of an accumulation of ice, and an accumulation of snow is effected simultaneously and independently, for said window, for said mirror, and for said light simultaneously and independently.

Another objective of the invention is to provide an inexpensive automatic method for preventing the forming of ice and snow and condensation blocking the vision via front and rear automobile windows, lights and mirrors when existing mechanism for achieving same fails or is not procurable, while the automobile is in operation thereby preventing accidents.

Other objectives will become apparent during the course of this disclosure.

BRIEF DESCRIPTION OF THE DRAWINGS

FIG. 1 also illustrates the rear automobile window and thereon a plurality of containers 1 containing a quantity of solid hygroscopic material 4, which may include sugars.

DETAILED DESCRIPTION OF THE DRAWINGS

Among the underlying principles of operation of the innovative apparatus is as follows: When hygroscopic material 4 such as calcium chloride, calcium sulfate, magnesium chloride, aluminum chloride, sodium chloride, and ammonium chloride comes into contact with snow, the snow melts and thus wets the hygroscopic material 4. A potion of the hygroscopic material 4 is dissolved in the melted snow which is now water that is allowed to seep through a special container 1 so constructed for allowing such seepage. The seepage moves down the outer surface area of the windows 2 thereby melting the snow and any ice forming thereon.

Figure 1:
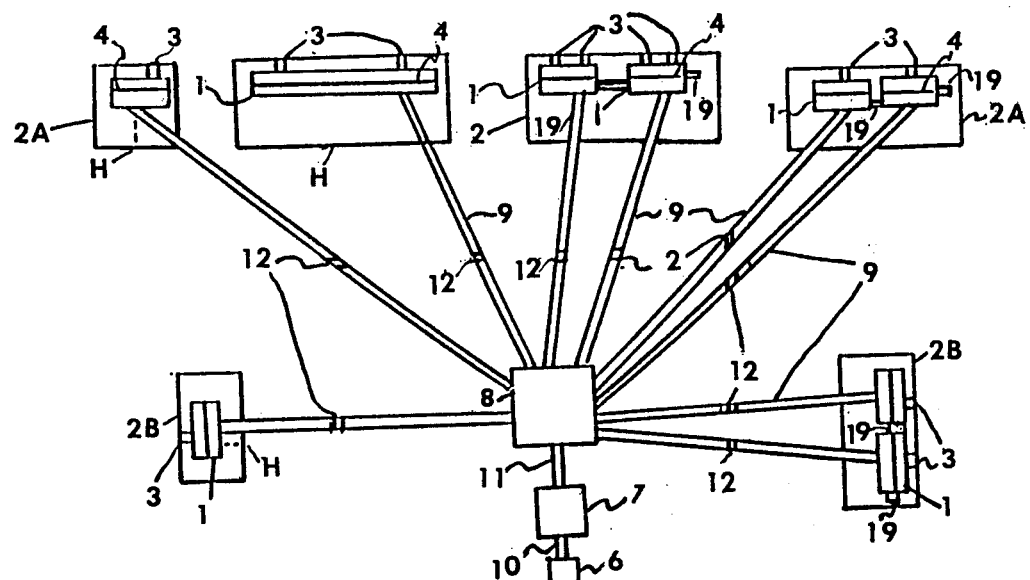
FIG. 1 is a drawing which represents an automobile window (or windshield), a domicile window, an office window 2, a mirror 2A, an external light 2B and thereon a container 1 containing a quantity of granular hygroscopic material 4. Also shown in FIG. 1 is a foot or electric pump device for pumping a quantity of water from a water reservoir or storage tank (normally located under the hood) 8 for increasing the wetting process of the hygroscopic material 4 thereby providing a faster "drip" of the hygroscopic material-water mix (and if desired a small quantity of detergent may also be inserted therein) at a rate in a relationship in accordance with the rate of pumping of the mix upon the front and/or rear window. The pumping device may be specifically made for this purpose or one or more hoses connecting one or more containers 1 to the existing "window washer" pumping device already contained in most automobiles for washing the front window of automobile while using the windshield washer already contained within the storage tank for same. Also, because most commercial window washer fluid already contains a quantity of detergent or other chemical prepared for use in cleaning windows, the window washer fluid pumped via the existing window washer pump onto container 1 containing the hygroscopic material 4 will result in a water-hygroscopic material-detergent or soap mix thereby preventing snow and ice from forming while simultaneously cleaning the window when a second hose 9 carries the pumped water-hygroscopic material-detergent mix to the rear window of the automobile. Urea may also be included in container 1 operating independently and in conjunction with hygroscopic material for preventing snow and ice from forming while simultaneously clearing the windows.

FIG. 1 illustrates how container 1 is attached to the inside side (facing the inner space for condensation reduction) and/or the outside side (facing the outer space for snow and ice prevention and clearing) of a window 2 or light 2B or mirror 2A via attaching means 3 which may be simple hooks or glued tape or "velcro" or other means for attaching both container 1 and the window 2 and/or window frames (not shown) to each other such that container 1 containing the hygroscopic material 4 lays upon the window of the automobile e.g. in a position providing for seepage and contact of falling snow upon the hygroscopic material 4 and for seepage of the dissolved material upon the window surface. In providing the function described above container 1 may be made of porous material (which may be paper, cloth or wood not shown) for providing a housing for the hygroscopic material 4 similar to the housing provided by the porous paper material providing a housing for tea. Like tea bags container 1 may be so constructed so as to be disposable after use since both the hygroscopic material 4 and the porous material comprising container 1 are very inexpensive. Container 1 of FIG. 2 in providing the identical purpose described above may be constructed such that it is open wider at the top portion thereof and having perforations 5 at the bottom for allowing seepage of the dissolved hygroscopic material-water mixture upon window 2 mirror 2A, light 2B.

Figure 2:
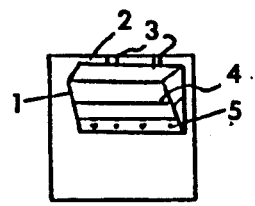
FIG. 2 is a drawing of container 1 such that container 1 extends outward at its upper portion while narrowing at the bottom where the perforations 5 for releasing the hygroscopic material-water mix upon the auto window 2 formed as a result of falling on 4 via the top of container 1 and/or formed as a result of pumped water when peddle 6 activates pump 7 via connecting means 10 thereby pumping the liquid to container(s) 1 via connecting means 11 connecting pump 7 to reservoir 8 onto hose(s) 9 into container 1 as shown in FIG. 1.
Figure 3:
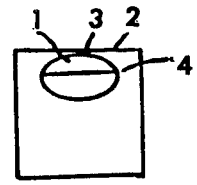
FIG. 3 is a drawing of container 1 comprising porous material housing the granular hygroscopic material 4 like the porous material housing tea of a tea bag of other porous material whereby providing for falling snow to contact material 4 and liquid forming as a result of the contact seeping out via the porous material of container 1 upon window 2 melting any snow or ice having contact with the liquid. Also liquid may simultaneously and independently be pumped upon hygroscopic material 4 as a result of pumped water when peddle 6 activates pump 7 via connecting means 10 thereby pumping the liquid to container(s) 1 via connecting means 11 connecting pump 7 to reservoir 8 onto hose(s) 9 into container 1 as shown in FIG. 1.
Figure 2A:
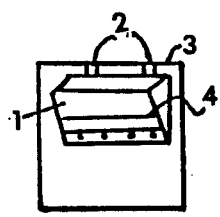
FIG. 2A is a drawing identical to FIG. 2 and functions in the same way as that of FIG. 2. However, whereas 2 of FIG. 2 represents a window, 2A of FIG. 2A represents a mirror.
Figure 3A:
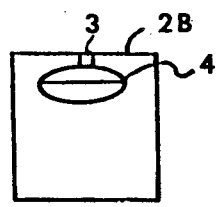
FIG. 3A is a drawing identical to FIG. 3 and functions in the same way as that of FIG. 3. However, whereas 2 of FIG. 3 represents a window, 2A of FIG. 3A represents a mirror.
Figure 2B:
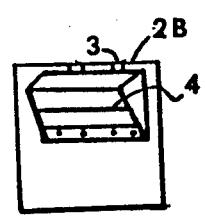
FIG. 2B is a drawing identical to FIG. 2 and functions in the same way as that of FIG. 2. However, whereas 2 of FIG. 2 represents a window, 2A of FIG. 2A represents a light.
Figure 3B:
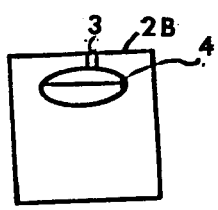
FIG. 3B is a drawing identical to FIG. 3 and functions in the same way as that of FIG. 3. However, whereas 3 of FIG. 3 represents a window, 2B of FIG. 3B represents a light operated by AC or DC current.

The wider top portion of container 1 shown in FIG. 2 providing for a greater collection of falling snow flakes so as to provide faster dissolving of the hygroscopic material 4 loosely contained therein or packaged in the porous material in a packet. FIG. 1 also illustrates how a plurality of containers 1 may be attached to the rear window and/or to the front window and/or side window 2 of the automobile, home or office or attached to a mirror 2A or 2B. A plurality of containers 1 may additionally be attached to the remainder of the inner and outer sides of the window 2 mirror 2A light 2B for greater condensation reduction and equalization in a relationship in accordance with the absorption of the condensation by the hygroscopic material. Hence it follows that a greater quantity of hygroscopic material and a greater quantity of containers 1 containing such material strategically placed in proximity to the window 2, light 2B or mirror 2A, the greater the quantity of condensation absorption resulting thereby.

The pump mechanism shown in FIG. 1 functions as follows: When an increased rate of seepage from container 1 onto window 2, and/or light 2B, and/or mirror 2B is desired such as during a snow storm and the like, the operator of the automobile simply pushes down on peddle (or knob) 6 thereby activating pump 7 to drive water from reservoir 8 through hose(s) 9 onto the hygroscopic material 4 contained in container 1 at a rate in a relationship in accordance with the rate of pumping, thus wetting hygroscopic material 4 sufficiently so as to provide a greater quantity of the water-hygroscopic material 4 mixture seeping down upon the surface of window 2 in a relationship in accordance with the rate of pumping.

Understandably, an automatic pump 7 identical to those already located in many automobiles having means for controlling the speed or rate of pumping (not shown) may be employed for providing automatic pumping via hose 9. Hence, the pump mechanism shown in FIG. 1 may comprise a window washing mechanism already existing in most cars having additional hoses 9 leading from a water tank or reservoir 8 or a window washing commercially available fluid reservoir 8 located below the hood of the automobile, to container 1 such that when pump 7 is pumped it forces the water or window washing fluid or a detergent liquid via hose 9 to hygroscopic material 4 at a rate in a relationship in accordance with the rate of pumping onto The wider top portion of container 1 shown in FIG. 2 providing for a greater collection of falling snow flakes so as to provide faster dissolving of the hygroscopic material 4 loosely contained therein or packaged in the porous material in a packet. FIG. 1 also illustrates how a plurality of containers 1 may be attached to the rear window and/or to the front window and/or side window 2 of the automobile, home or office or attached to a mirror 2A or light 2B. A plurality of containers 1 may additionally be attached to the remainder of the inner and outer sides of the window 2 mirror 2A light 2B for greater condensation reduction and equalization in a relationship in accordance with the absorption of the condensation by the hygroscopic material. Hence it follows that a greater quantity of hygroscopic material and a greater quantity of containers 1 containing such material strategically placed in proximity to the window 2, light 2B or mirror 2A, the greater the quantity of condensation absorption resulting thereby.

The pump mechanism shown in FIG. 1 functions as follows: When an increased rate of seepage from container 1 onto window 2, and/or light 2B, and/or mirror 2B is desired such as during a snow storm and the like, the operator of the automobile simply pushes down on peddle (or knob) 6 thereby activating pump 7 to drive water from reservoir 8 through hose(s) 9 onto the hygroscopic material 4 contained in container 1 at a rate in a relationship in accordance with the rate of pumping, thus wetting hygroscopic material 4 sufficiently so as to provide a greater quantity of the water-hygroscopic material 4 mixture seeping down upon the surface of window 2 in a relationship in accordance with the rate of pumping.

Understandably, an automatic pump 7 identical to those already located in many automobiles having means for controlling the speed or rate of pumping (not shown) may be employed for providing automatic pumping via hose 9. Hence, the pump mechanism shown in FIG. 1 may comprise a window washing mechanism already existing in most cars having additional hoses 9 leading from a water tank or reservoir 8 or a window washing commercially available fluid reservoir 8 located below the hood of the automobile, to container 1 such that when pump 7 is pumped it forces the water or window washing fluid or a detergent liquid via hose 9 to hygroscopic material 4 at a rate in a relationship in accordance with the rate of pumping onto any window 2, mirror 2A, and/or light (bulb) 2B.

It should be noted that a pinch clip 12 is provided for pinching any one or more hoses 9 such that clip 12 renders hoses 9 functionally in operation or not functionally in operation by allowing or not allowing the flow liquid from reservoir 8 to container 1. This also provides for each of a plurality of containers 1 to operate simultaneously in conjunction with one another and independently of one another.

Also double containers 1 as shown in 2, 2B may be understood as the same may be attached to both sides of window 2 and light 2B, or may be understood as the same is attached to one side of 2, 2A, 2B.

Also, at times it may be advantageous to have an condensation absorbing sponge-like porous material 19 connected to one or more containers 1 thereby aiding in the advancement of the wetting of hygroscopic material in container 1 and/or the hygroscopic material contained in 19 when the wetting is a result of condensation absorbed by 19, since 19 when continued from the right side of 1 in 2, 2A, 2B may be made to cover all or some of the area of 2, 2A, 2B thereby either serving as the conduit by which the condensation may be absorbed by the hygroscopic material in container 1 or absorbed by the hygroscopic material contained in 19 (inserted by cutting a pocket in 19) and 1. Hence 19 may also functions as does container 1 when the hygroscopic material is located therein and 19 may serve as the "conduit" for container 1. Therefore, condensation on the inside of an automobile window may be absorbed by the hygroscopic material in container 1 on the outside of the automobile window via one or more of 19 leading into 1. With 19 (and 1) located in a proximity to the condensation on the inside (or outside) of the window 2 mirror 2A and light 2B thereby providing faster liquification of the hygroscopic material thus providing quicker melting of the snow and ice on the outside of window 2, mirror 2A and Light 2B when the dissolved hygroscopic material falls upon ice and snow located on window 2, mirror 2A and light 2B.

Also, hatched line H shown on 2, 2A, 2B may represent a divided or double window, mirror and light or a first and second side of same. Hence, FIG. 1 illustrates how a single container 1 simultaneously and independently prevents and clears an accumulation of snow, ice and condensation upon a single or a plurality of windows, mirrors and lights simultaneously and independently.

What is claimed is:

1. A method for preventing falling snow, ice, and condensation from accumulating upon one and a plurality of the following: a window, a mirror, a light, and for clearing an accumulation of snow, ice and condensation already accumulated upon said window, said mirror and said light, the steps comprising, attaching one and a plurality of containers in a proximity to said one and a plurality of said window, said mirror, and said light, said one and a plurality of containers having means for allowing contact of said snow, said ice and said condensation, with hygroscopic material contained in said one and a plurality of containers such that when said snow and said ice and said condensation comes into said contact with said hygroscopic material, said snow and ice and said condensation dissolves a quantity of said hygroscopic material, said dissolved material flows onto said one and a plurality of said window, said mirror, said light via means for allowing said flow.

2. A method of claim 1 wherein said hygroscopic material comprising one and a plurality of the following group: calcium chloride, calcium sulfate, magnesium chloride, sugar, sodium chloride, ammonium chloride, urea.

3. A method of claim 1 comprising wherein said clearing said accumulation of said ice, and of said snow and said preventing of said accumulation of ice and snow is effected simultaneously and independently for the surface of an automobile.

4. A method of claim 1 wherein said means for allowing said flow comprising one and a plurality of perforations.

5. A method of claim 1 comprising wherein said clearing said accumulation of said ice, and of said snow and said preventing of said accumulation of ice and snow is effected simultaneously and independent.

6. A method of claim 1 wherein said clearing and preventing of said accumulation of said condensation and of said ice, and of said snow is effected simultaneously and independently, by said one and plurality of containers.

7. A method for preventing falling snow, ice, and condensation from accumulating upon one and a plurality of the following: a window, a mirror, a light, and for clearing an accumulation of snow, ice and condensation already accumulated upon said window, said mirror and said light, the steps comprising, attaching one and a plurality of containers in a proximity to said one and a plurality of said window, said mirror, and said light, said one and a plurality of containers having means for allowing contact of said snow, said ice and said condensation, with hygroscopic material contained in said one and a plurality of containers such that when said snow and said ice and said condensation comes into said contact with said hygroscopic material, said snow and ice and said condensation dissolves a quantity of said hygroscopic material, said dissolved material flows onto said one and a plurality of said window, said mirror, said light via means for allowing said flow, pumping liquid pumping means for providing a quantity of said liquid flowing onto said hygroscopic material in a relationship in accordance with said pumping, said liquid advancing said dissolving of said hygroscopic material in accordance with said pumping, said liquid comprising said dissolved hygroscopic material flows onto said one and a plurality of said window, said mirror and said light via said means for allowing said flow.

8. A method of claim 7 wherein said hygroscopic material comprising one and a plurality of the following group: calcium chloride, calcium sulfate, magnesium chloride, sugar, sodium chloride, ammonium chloride, urea.

9. A method of claim 7 wherein said means for allowing said flow comprising one and a plurality of perforations.

10. A method of claim 7 wherein said clearing and preventing of said accumulation of said condensation and of said ice, and of said snow is effected simultaneously and independently, by said one and plurality of containers.

11. A method of claim 7 wherein said liquid pumping means comprising a liquid pumping means already installed in an automobile.

12. A method of claim 7 wherein said liquid comprising window washing fluid.

13. A method of claim 7 comprising wherein said clearing said accumulation of said ice, and of said snow and said preventing of said accumulation of ice and snow is effected simultaneously and independently for the surface of an automobile.

14. A method of claim 7 comprising wherein said pumping is effected manually.

15. An apparatus for simultaneously and independently preventing falling snow, ice, and condensation from accumulating upon one and a plurality of the following: an automobile window, an automobile mirror, an automobile light, and for clearing an accumulation of snow, ice and condensation already accumulated upon said window, said mirror and said light, comprising, one and a plurality of containers having means for allowing contact of said falling snow and ice and humidity comprising said condensation, with hygroscopic material contained in said one and a plurality of containers such that when said snow and said ice and said humidity comprising said condensation comes into said contact with said hygroscopic material, said snow and said ice and said humidity comprising said condensation dissolves a quantity of said hygroscopic material, said dissolved material flows onto said one and a plurality of surfaces via means for allowing said flow of said material comprising a solution of said hygroscopic material and melted said snow and ice and said humidity comprising said condensation, thereby providing said preventing and said clearing of said accumulation of ice and snow and condensation by melting of said ice and snow in accordance with said flow, and by absorbing said humidity comprising said condensation in accordance with said contact, liquid pumping means for providing a quantity of said liquid flowing onto said hygroscopic material in a relationship in accordance with a rate of said pumping, said liquid advancing said dissolving of said hygroscopic material in accordance with said rate of pumping, said liquid comprising said dissolved hygroscopic material flows onto said one and a plurality of said window, said mirror, said light via said means for allowing said flow, thereby providing said preventing and said clearing by melting of said accumulation of snow and ice in accordance with said flow.

16. An apparatus of claim 15 wherein said hygroscopic material comprising one and a plurality of the following group: calcium chloride, calcium sulfate, magnesium chloride, sugar, sodium chloride, ammonium chloride, urea.

17. An apparatus of claim 15 wherein said means for allowing said flow comprising one and a plurality of perforations.

18. An apparatus of claim 15 wherein said liquid pumping means comprising a liquid pumping means already installed in an automobile.

19. An apparatus of claim 15 wherein said liquid comprising window washing fluid.

20. An apparatus of claim 15 comprising wherein said clearing said accumulation of said ice, and of said snow and said preventing of said accumulation of ice and snow is effected simultaneously and independently for a surface of said automobile.

21. An apparatus for preventing falling snow, ice, and condensation from accumulating upon one and a plurality of surfaces, and for clearing an accumulation of snow, ice and condensation already accumulated upon said one and a plurality of surfaces, comprising, means for allowing contact of said falling snow and ice and said condensation, with hygroscopic material contained in said means such that when said snow and said ice and said condensation comes into said contact with said hygroscopic material, said snow and ice and said condensation dissolves a quantity of said hygroscopic material, said dissolved material flows onto said one and a plurality of surfaces via means for allowing said flow, means for advancing said dissolving of said hygroscopic material.

22. An apparatus of claim 21 comprising wherein said clearing said accumulation of said ice, and of said snow and said condensation and said preventing of said accumulation of ice and snow and said condensation is effected simultaneously and independently.

23. An apparatus of claim 21 wherein said hygroscopic material comprising one and a plurality of the following group: calcium chloride, calcium sulfate, magnesium chloride, sugar, sodium chloride, ammonium chloride, urea.

24. An apparatus for preventing falling snow, ice, and condensation from accumulating upon one and a plurality of surfaces, and for clearing an accumulation of snow, ice and condensation already accumulated upon said one and a plurality of surfaces, comprising, one and a plurality of containers for allowing contact of said falling snow and said ice and said condensation, with hygroscopic material contained in said one and a plurality of containers such that when said snow and said ice and said condensation comes into said contact with said hygroscopic material, said snow and ice and said condensation dissolves a quantity of said hygroscopic material, said dissolved material flows onto said one and a plurality of surfaces via means for allowing said flow, liquid pumping means for providing a quantity of said liquid flowing onto said hygroscopic material in a relationship in accordance with said pumping, said liquid advancing said dissolving of said hygroscopic material in accordance with said pumping, said liquid comprising said dissolved hygroscopic material flows onto said one and a plurality of surfaces via said means for allowing said flow.

25. An apparatus of claim 24 wherein said hygroscopic material comprising one and a plurality of the following group: calcium chloride, calcium sulfate, magnesium chloride, sugar, sodium chloride, ammonium chloride, urea.

26. An apparatus of claim 24 wherein said liquid comprising window washing fluid.

27. An apparatus of claim 24 comprising wherein said advancing is effected manually.

28. An apparatus of claim 24 comprising wherein said clearing said accumulation of said ice, and of said snow and said condensation and said preventing of said accumulation of ice and snow and said condensation is effected simultaneously and independently.

29. A method for simultaneously and independently preventing falling snow, and ice, from accumulating upon one and a plurality of surfaces, and clearing an accumulation of snow and ice already accumulated upon said one and a plurality of surfaces, the steps comprising, attaching one and a plurality of containers in a proximity to said one and a plurality of surfaces, said one and a plurality of containers having means for allowing contact of said falling snow and ice with hygroscopic material contained in said one and a plurality of containers such that when said snow and said ice comes into said contact with said hygroscopic material, said snow and ice dissolves a quantity of said hygroscopic material, said dissolved material flows onto said one and a plurality of surfaces via means for allowing said flow of said material comprising a solution of said hygroscopic material and melted said snow and ice, thereby providing said preventing and said clearing of said accumulation of said ice and snow by melting of said ice and snow in accordance with said flow.

30. A method of claim 29 wherein said hygroscopic material comprising one and a plurality of the following group: calcium chloride, calcium sulfate, magnesium chloride, sugar, sodium chloride, ammonium chloride, urea.

31. A method of claim 29 wherein said means for allowing said flow comprising one and a plurality of perforations.

32. A method for simultaneously and independently preventing falling snow, and ice, from accumulating upon one and a plurality of surfaces and clearing an accumulation of snow and ice already accumulated upon said one and a plurality of surfaces, the steps comprising, attaching one and a plurality of containers in a proximity to said one and a plurality of surfaces, said one and a plurality of containers having means for allowing contact of said falling snow and ice with hygroscopic material contained in said one and a plurality of containers such that when said snow and said ice comes into said contact with said hygroscopic material, said snow and ice dissolves a quantity of said hygroscopic material, said dissolved material flows onto said one and a plurality of surfaces via means for allowing said flow of said material comprising a solution of said hygroscopic material and melted said snow and ice, thereby providing said preventing and said clearing of said accumulation of ice and snow by melting of said ice and snow in accordance with said flow, pumping liquid pumping means for providing a quantity of said liquid flowing onto said hygroscopic material in a relationship in accordance with a rate of said pumping, said liquid advancing said dissolving of said hygroscopic material in accordance with said rate of pumping, said liquid comprising said dissolved hygroscopic material flows onto said one and a plurality of surfaces via said means for allowing said flow, thereby providing said preventing and said clearing of said accumulation of ice and snow in accordance with said flow.

33. A method of claim 32 wherein said hygroscopic material comprising one and a plurality of the following group: calcium chloride, calcium sulfate, magnesium chloride, sugar, sodium chloride, ammonium chloride, urea.

34. A method of claim 32 wherein said means for allowing said flow comprising one and a plurality of perforations.

* * * * *

UNITED STATES PATENT AND TRADEMARK OFFICE
CERTIFICATE OF CORRECTION

PATENT NO. : 5,057,159

DATED : Oct. 15, 1991

INVENTOR(S) : Morton Weintraub

It is certified that error appears in the above-identified patent and that said Letters Patent is hereby corrected as shown below:

ON TITLE PAGE: Item [76]

Delete "229" and insert --522--.

Signed and Sealed this

Seventeenth Day of December, 1991

Attest:

HARRY F. MANBECK, JR.

*Attesting Officer*     *Commissioner of Patents and Trademarks*